United States Patent [19]
Cicognani

[11] 4,193,312
[45] Mar. 18, 1980

[54] TRAPEZOIDAL DRIVING BELT
[75] Inventor: Mario Cicognani, Milan, Italy
[73] Assignee: Industrie Pirelli S.p.A., Milan, Italy
[21] Appl. No.: 897,498
[22] Filed: Apr. 18, 1978
[30] Foreign Application Priority Data
  May 4, 1977 [IT] Italy .................. 23149 A/77
[51] Int. Cl.² .............................................. F16G 5/20
[52] U.S. Cl. ................... 74/231 C; 74/231 P; 74/231 CB; 198/648
[58] Field of Search .............. 74/231 C, 231 P, 232, 74/231 CB, 231 M, 234, 229; 198/648, 712, 731

[56] References Cited
U.S. PATENT DOCUMENTS

| | | | |
|---|---|---|---|
| 642,549 | 1/1900 | Kennedy | 74/234 |
| 720,340 | 2/1903 | Fouillaron | 74/234 |
| 3,621,727 | 11/1971 | Cicognani | 74/231 C X |
| 3,808,901 | 5/1974 | Berg | 74/231 C |

FOREIGN PATENT DOCUMENTS 1095630  12/1967  United Kingdom ............... 74/231 P Primary Examiner—C. J. Husar
Assistant Examiner—Conrad Berman
Attorney, Agent, or Firm—Stevens, Davis, Miller & Mosher

[57] ABSTRACT

A drive belt adapted for use in a continuous speed variator has an elongated annular body member reinforced with inextensible cords which are embedded along the longitudinal axis of the body member. A series of teeth is disposed along one side of the body member and rigid wedge-shaped members connected to the teeth have a trapezoidal cross-section perpendicular to the plane of symmetry of the body member.

11 Claims, 9 Drawing Figures

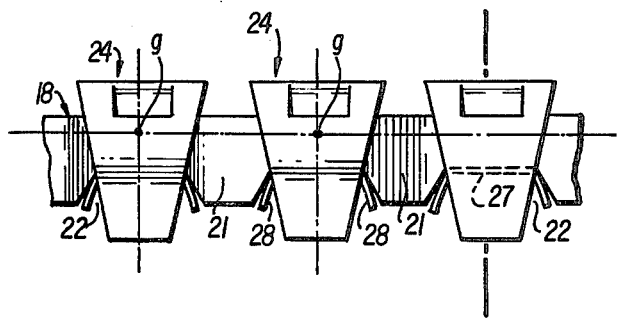
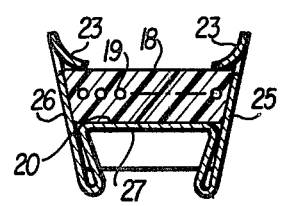
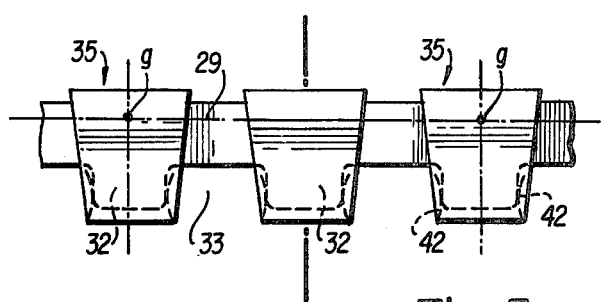
Fig. 4  Fig. 4a
Fig. 5  Fig. 5a
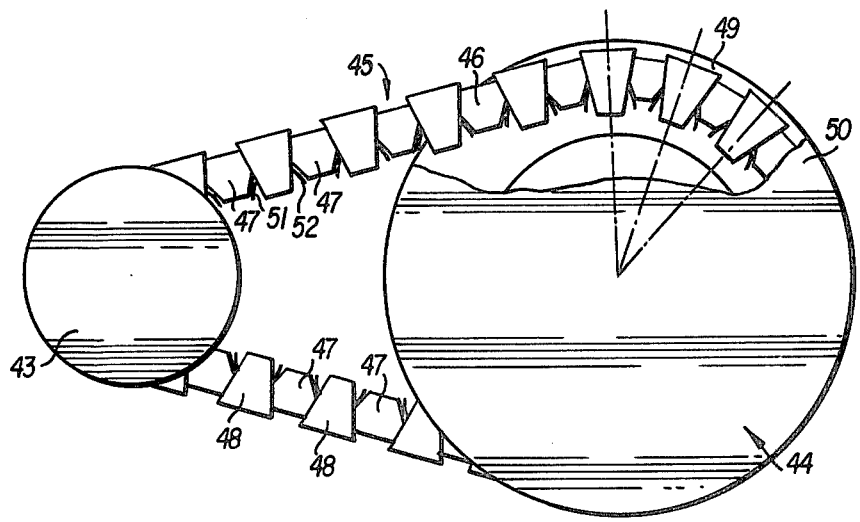
Fig. 6

TRAPEZOIDAL DRIVING BELT

This invention relates to a trapezoidal driving belt and, more particularly, to a trapezoidal driving belt for continuous speed variators.

As it is known, a trapezoidal driving belt is a belt which is employed in a drive including at least two pulleys, each of which is provided with a groove in which is inserted the trapezoidal belt.

A continuous speed variator is a particular type of drive formed by a couple of pulleys, a driving one and a driven one, at least one of which has a groove of variable width and by a driving belt engaging with the said pulleys.

Different types of drives and several kinds of continuous speed variators are known which differ from one another above all by the belts employed in them.

A first type of driving belt consists of a trapezoidal belt of elastomeric material.

Another type of driving belt particularly fit for continuous speed variators is formed by a plurality of threads or cords, whose ends are connected to form a closed ring, all of the same size and all parallel to one another on which are inserted in a sliding or in a fixed way little metallic blocks. Driving belts and continuous speed variators belts have several inconveniences.

In the case of the trapezoidal belts of the known type, the principal disadvantage they have consists in their incapacity of transmitting high powers owing to their susceptibility to deformation in the normal direction to the sides of the belts; another disadvantage of trapezoidal belts is that they have such short lifetimes that they can be used only where belt replacement is easy.

In the case of the known belts for continuous speed variators formed by little wedge-shaped blocks connected to one another by a plurality of cords, even if they allow the transmission of higher power than those transmittable with the trapezoidal belts, such belts have disadvantages including excessive extensibility in the long run, a tendency to break because of fatigue of the cords which connect the different metallic little blocks to one another and irregular wear and tear on the work surface of the metallic little blocks and on the side surfaces of the pulley grooves which in the long run lead to a considerable change in the ratios of the speed which must be transmitted.

An object of the present invention is to provide a trapezoidal driving belt and, in particular, a driving belt for continuous speed variators which does not have the above mentioned disadvantages of the belts of the known type and, particularly, is capable of transmitting higher power than those transmittable with the known belts, which is light, practically inextensible and has a substantial resistance to wear and tear such as to allow a long lifetime for the drives and the continuous speed variators in which it is employed.

In accordance with the present invention, a trapezoidal driving belt is provided that has an annular body of elastomeric or plastic material in which is embedded a reinforcing insert formed by a plurality of inextensible cords parallel and coplanar to one another disposed along the largest dimension of the annular body, a toothing of elastomeric or plastic material on at least one side of the annular body and wedge-shaped rigid bodies connected to the toothing, wrapping said annular body, trapezoidal-shaped in cross-section perpendicular to the plane of symmetry of the latter.

The present invention will be better understood from the following detailed description, made only for the purpose of nonlimitative example with reference to the accompanying drawing, in which:

FIG. 4 and 4a show a side view and a cross-section of a belt in one embodiment of the invention;

FIG. 5 and 5a show a side view and a cross-section of a belt in an additional embodiment of the invention; and FIG. 6 shows a side view of a continuous speed variator according to the invention without some component parts.

The more general idea of solution for a trapezoidal driving belt includes a belt toothed at least on one side, to the toothing of which are connected some wedge-shaped, trapezoidal rigid blocks and, particularly, having the form of an isosceles trapezium, in a cross-section perpendicular to the plane of symmetry of the belt itself.

Figures 1, 1A:
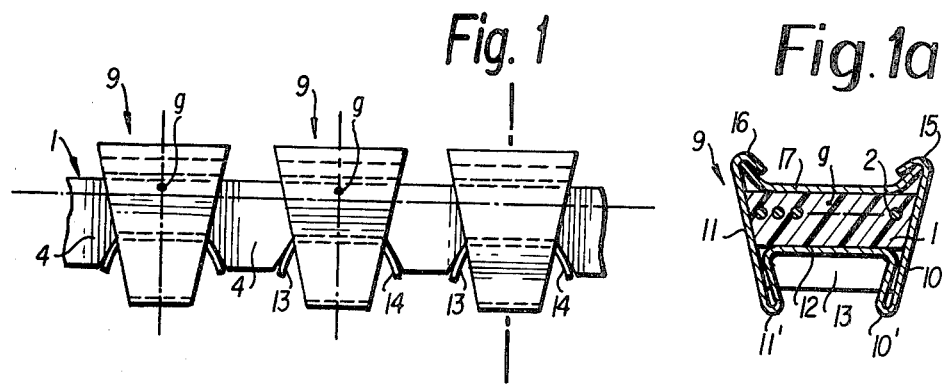
FIG. 1 and 1a show in side view and in cross-section a portion of a belt according to the invention.
Figure 2:
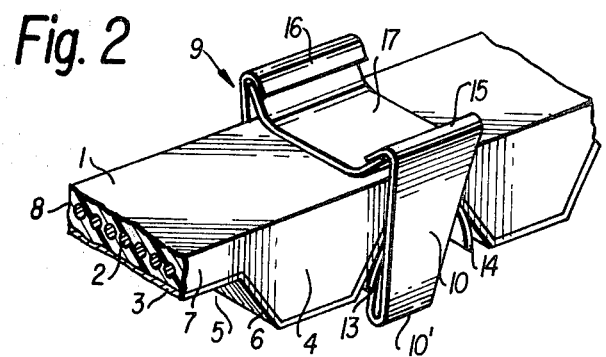
FIG. 2 shows a perspective view in an increased scale of a portion of the belt of FIG. 1 without some component parts.

In FIGS. 1 and 2 is shown a trapezoidal driving belt according to one embodiment of this invention. As may be noted in FIGS. 1 and 2, the belt includes an annular body 1 of elastomeric or plastic material in which is embedded a resistant traction insert formed by a plurality of inextensible cords or threads 2, for instance of steel or of glass-fiber, parallel and coplanar to one another.

On the side 3 of the annular body there is a toothing formed by teeth 4 in elastomeric or plastic material separated from one another by grooves 5.

Moreover, on the surface of the toothing there is a coating 6 consisting for example of at least one layer of rubberized fabric and in particular of self-lubricating rubberized fabric like the one described in the Italian Pat. No. 864,204 and the corresponding U.S. Pat. No. 3,621,727 granted Nov. 23, 1971.

As may be noted in FIGS. 1 and 2, the sides 7 and 8 of the annular body 1 and the sides of the teeth 4 lie on converging planes, so that in cross-section to the largest dimension of the belt both the annular body and the body of the teeth have the form of an isosceles trapezium.

In the grooves of the toothing, connected to the body 1, there are some wedge-shaped rigid bodies 9, the barycentre g of which lies on the side opposite to the toothing with respect to the plane of the resistant insert of the annular body. One of these wedge-shaped rigid bodies is clearly shown in FIGS. 2 and 3.

Figure 3:
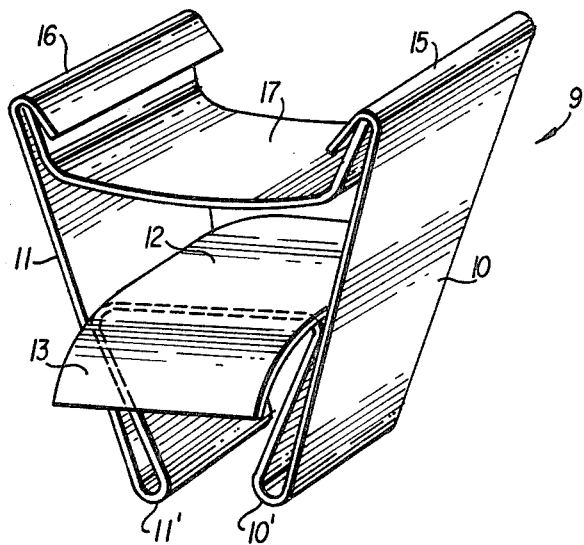
FIG. 3 shows an increased scale of a component part of the belt according to the invention.

As may be noted in FIGS. 2 and 3, a wedge-shaped rigid body consists of a generally U-shaped plate with wings 10 and 11 lying on planes converging towards each other on the side of the core 12 of the U-shaped plate.

The parts of the wings 10 and 11 near the core 12 are folded on themselves with folds 10' and 11' so that said core 12 is situated inside the above said two wings 10 and 11.

The core 12 has, on its sides adjacent to the wings, some little plates or projecting tongues 13 and 14 shaped according to the kinematically conjugate contour of the teeth 4.

In this particular case, as teeth 4 are rectilinear profiled teeth, the tongues 13 and 14 are shaped according to the involutes.

At their free ends, the wings 10 and 11 are folded to form the hooks 15 and 16 and between the hooks there is a foil-spring insert 17 through which the wedge-shaped rigid body can be blocked to the annular body 1 of the belt.

Furthermore, the surfaces of the tongues 13 and 14 facing the teeth of the toothing may be covered with a coating of low friction coefficient material as, for instance, a polyurethane elastomer charged with graphite or molybdenum sulphide and the surfaces 10 and 11 turned towards the outside of the belt are covered with a high friction coefficient coating as, for instance, a chloroprene elastomer.

According to another embodiment of the invention not represented in the figures, the wedge-shaped, rigid bodies are little blocks in plastic material, for example in phenolic resins provided in their inside with a cavity, of the same size as the belt body on which they must be inserted and to which they must be connected. Any kind of binding means may be used in this case.

In FIG. 4 is shown a belt according to a further embodiment of the invention.

As may be noted, the belt includes an annular body 18 in plastic or elastomeric material in which is embedded a resistant insert formed by a plurality of threads or cords 19, parallel and coplanar to one another, of inextensible material as steel or glass-fibers.

On the side 20 of the annular body 18 there is a toothing in elastomeric or plastic material consisting of teeth 21 separated from one another by grooves 22. Besides, the sides of the annular body 18 and the sides of the teeth lie on planes converging towards one another on the toothing side of the belt.

In the grooves 22 of the toothing there are some wedge-shaped rigid little blocks 24 connected, for example, through a tract of rigid foil 23, to the annular body 18.

Every wedge-shaped rigid little block 24, the barycentre g of which lies on the plane of the resistant insert of the annular body, includes a tract of substantially U-shaped profile with wings 25 and 26 converging on a line that, with respect to the core 27, lies on the side opposite to the one on which the wings are situated. The core 27 of the profile is in contact with the annular body 18 at the bottom of the toothing groove and to the above mentioned core 27 are fastened, on its sides adjacent to the wings 25 and 26, tongues 28 projecting from the core and turned towards the sides adjacent to the one of the wings.

Tongues 28 are shaped according to a kinematically conjugate contour of the teeth of the toothing and when, as in the embodiment of the invention represented in FIG. 4, the teeth 21 have a rectilinear profile, the tongues 28 have an involute contour.

According to another embodiment of the invention, not represented in the figures, tongues 28 have a rectilinear profile and teeth 21 have, consequently, an involute contour.

In FIG. 5 another embodiment of the invention is shown.

As may be noted in FIG. 5, the belt includes an annular body 29 in elastomeric or plastic material in which is embedded a resistant insert formed by a plurality of inextensible threads or cords 30, for instance, in steel or in glass-fiber.

On the side 31 of the annular body 29 there is a toothing of elastomeric or plastic material consisting of a plurality of teeth 32 separated from one another by grooves 33. Moreover, the lateral sides of the annular body 29 and the sides of the teeth lie on planes converging towards one another on the toothing side of the belt. In every tooth, connected to the annular body 29, there are some wedge-shaped little blocks 35, the barycenter g of which lies on the plane of the resistant insert of the annular body.

Every wedge-shaped little block includes a tract of a U-shaped profile 36 with wings 37 and 38 converging on a line that, with respect to the core 39, lies on the side opposite to the one on which the wings are situated.

The core 39 of the U-shaped profile 36 is in contact with the tops of a tooth 32 and at the free ends of the wings are provided hooks 40 to which are pressed against side 41 of the annular body 29.

To the core 39 of the U-shaped profile 36 are fastened, on its sides adjacent to the wings 37 and 38, tongues 42 projecting from the core and turned towards the same side of the above mentioned wings 37 and 38. Said tongues 42 are shaped according to the kinematically conjugate contour of the teeth and when, as in the embodiment of the invention represented in FIG. 5, the teeth 32 have a rectilinear profile the tongues 42 have an involute contour.

In FIG. 6 is shown a continuous speed variator as a particular case of a belt drive employing a belt according to the present invention and, in particular, a belt according to the embodiment of the invention represented in FIG. 1.

As may be noted in FIG. 6, the illustrated continuous speed variator includes a couple of pulleys, namely, a driving pulley 43 and a driven pulley 44, which is a variable groove pulley.

A belt 45, according to the invention, that is a belt including an annular body 46 of elastomeric material in which is embedded a resistant insert formed by a plurality of inextensible cords, is disposed on the two pulleys 43 and 44.

On the side of the annular body 46 turned towards the inside of the drive there is a toothing consisting of a plurality of teeth 47 separated from one another by grooves.

Connected to the annular body, in every groove of the toothing, there is a wedge-shaped little block 48 exactly equal to the one represented on an increased scale in FIG. 3.

The belt 45 is in contact with the pulley groove only through the lateral sides of the wedge-shaped little blocks 48.

The working of the continuous speed variator shown in FIG. 6 is as follows.

The driving pulley 43 moves at constant speed receiving the motion from the shaft of a motor not represented in the figures. On the ground of the speed desired for the driven pulley 44, the width of the groove of said pulley, which, as previously said, is a variable width groove pulley, is fixed beforehand, by drawing near each other or driving away from each other the two parts 49 and 50 that form the above mentioned pulley.

With the movement of the driving pulley, the motion is transmitted to the belt through the friction exercised between the lateral sides of the wedge-shaped little blocks and the pulley groove with which said little blocks come into contact.

In its turn, the belt transmits the motion to the driven pulley, because the wedge-shaped little blocks come into contact through their lateral sides with the groove of the driven pulley. As soon as the wedge-shaped little blocks come into contact with the grooves of one of the pulleys, they are compelled to follow a rotation also around the axis of rotation of the pulley (as may be noted in FIG. 6) because the tongues 51 and 52 of every wedge-shaped rigid little block engage with the teeth 47 of the toothing near the wedge-shaped rigid little block.

From the above mentioned description of the belt, according to the present invention, and of the working of the continuous speed variator it may be easily understood that the advantages previously explained can be realized.

In fact, the high efficiency and the constant ratio of the drive in the long run, owing to the long lifetime and to the reduced wear and tear of the belt can be deduced by noting that the contact between the belt and the pulleys, is in fact, between a metallic surface and a surface of elastomeric material, that is with a surface having a high friction coefficient.

Moreover, by providing a toothed coupling between the elements of the belt, that is between the wedge-shaped rigid little blocks and the toothing, while guaranteeing the elimination of every relative rotation of the above said wedge-shaped little blocks and the pulley grooves, any possibility of relative rotation between the said elements is excluded and, consequently, any danger due to irregular wear and tear of the working surfaces of the belt is eliminated.

Furthermore, because of the high longitudinal flexibility of the belt according to the invention, there is a low power requirement in the drive using the belt for folding the belt itself on the pulleys and, therefore, a low hysteresis all to the advantage of a higher efficiency of the drives and to the possibility of using pulleys of small diameter.

Finally, the high rigidity of the wedge-shaped little blocks and the elimination of the relative movements between said wedge-shaped little blocks and the pulley grooves allows the transmission of considerably higher powers than those transmittable through the belts of known type and, moreover, guarantees in the long run the precision and the constancy in the speed ratios obtainable with the drives which employ the belts according to the invention.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A trapezoidal driving belt comprising an annular body of elastomeric or plastic material having embedded therein a resistant insert formed by a plurality of inextensible cords parallel and coplanar to one another disposed according to the largest dimension of the annular body, a toothing of elastomeric or plastic material on at least one side of the annular body, and wedge-shaped rigid bodies, connected to the toothing, wrapping said annular body, trapezoidal-shaped in cross-section perpendicular to the plane of symmetry of the latter.

2. The belt of claim 1 characterized by the fact of having the wedge-shaped bodies provided with tongues projecting from them adapted to engage with the toothing of the annular body.

3. The belt of claim 1 or 2, characterized by having the barycenter of each wedge-shaped body lying at least on the side opposite to the plane containing the resistant insert with respect to the toothing of the annular body.

4. The belt of claim 3 characterized by having the barycenter of every wedge-shaped body lying on the plane containing the resistant insert of the annular body.

5. The belt according to claim 1 characterized by having the wedge-shaped bodies connected to the annular body at the grooves of the toothing.

6. The belt according to claim 1, 2, 3 or 4 characterized by having the wedge-shaped bodies connected to the annular body at the teeth of the toothing.

7. The belt according to claim 2 characterized by the presence of a low friction coefficient coating on the surface of the tongues, where the tongues come into contact with the toothing.

8. The belt according to claim 1 characterized by the presence of a high friction coefficient coating on the surface of the wedge-shaped bodies turned sideways, with respect to the annular body.

9. The belt according to claim 1 characterized by the fact that the wedge-shaped bodies are box-type bodies consisting of a portion of substantially U-shaped profile, provided at the ends of the wings with binding means for connection to the annular body of elastomeric or plastic material and provided, in correspondence to the edges of the core perpendicular to the wings, with projecting tongues curved according to the conjugate contour of the teeth.

10. The belt of claim 1 characterized by the fact that the wedge-shaped bodies are bodies of plastic material provided in their inside with a cavity of such size and shape as to couple with the body of the belt to which they are applied.

11. A drive belt having an elongated annular elastomeric or plastic body member, a plurality of inextensible reinforcing cords embedded in said body member extending longitudinally therethrough and disposed substantially parallel in transverse spaced relationship, a series of teeth spaced along one side of said elongated body member and a series of rigid wedge-shaped members connected to the teeth and extending along the length of said elongated body member, said wedge-shaped members having a trapezoidal-shaped cross-section perpendicular to the plane of symmetry of the said elongated member.

* * * * *